United States Patent
Williams et al.

(10) Patent No.: US 7,212,597 B2
(45) Date of Patent: May 1, 2007

(54) ACQUISITION AND RECONSTRUCTION TECHNIQUES OF AUTOMATIC RATE ADAPTATION AND TIME-DATA-CORRELATION FOR ARBITRARY SIGNAL TYPES

(75) Inventors: Michael Williams, Oak Hill, VA (US); Ronald Hirsch, Herndon, VA (US)

(73) Assignee: Avtec Systems, Inc., Chantilly, VA (US)

( * ) Notice: Subject to any disclaimer, the term of this patent is extended or adjusted under 35 U.S.C. 154(b) by 722 days.

(21) Appl. No.: 10/700,544

(22) Filed: Nov. 5, 2003

(65) Prior Publication Data

US 2004/0100996 A1    May 27, 2004

Related U.S. Application Data

(60) Provisional application No. 60/423,593, filed on Nov. 5, 2002.

(51) Int. Cl.
*H04L 7/00*    (2006.01)
(52) U.S. Cl. .................................... 375/355
(58) Field of Classification Search ............... 375/259, 375/295, 316, 354–356, 376; 370/445, 503
See application file for complete search history.

(56) References Cited

U.S. PATENT DOCUMENTS 4,550,292 A * 10/1985 Smith .......................... 331/2
5,398,263 A * 3/1995 Vanderspool et al. ....... 375/376
6,442,173 B1 * 8/2002 Barsoum et al. ............. 370/445
2005/0237954 A1 * 10/2005 Hasegawa et al. .......... 370/292

* cited by examiner

*Primary Examiner*—Don N. Vo
(74) *Attorney, Agent, or Firm*—Squire, Sanders & Dempsey L.L.P.

(57) ABSTRACT

A process of acquiring, transmitting and reconstructing data signals is disclosed. The process includes monitoring a timing reference signal produced by a timing reference and receiving an input data signals on input/output modules. The input data signals are sampled using one of an external sample clock and an internal sample clock. The process further includes recording an input rate, based on a number of samples received during an interval, a duration count, based on the number of cycles of the timing reference signal received between the first sample and the last sample in the sample interval, and a delay count, based on a number of cycles of the timing reference signal received between a start of the interval and a first sample clock cycle of the one of the external sample clock or the internal sample clock. Data packets are created, based on sampled input data and the measured input rate, the delay count for each interval. The data packets are transmitted and subsequently received and the input data signal is reconstructed based on the data packets.

18 Claims, 2 Drawing Sheets

ACQUISITION AND RECONSTRUCTION TECHNIQUES OF AUTOMATIC RATE ADAPTATION AND TIME-DATA-CORRELATION FOR ARBITRARY SIGNAL TYPES

REFERENCE TO RELATED APPLICATIONS

This application claims priority of U.S. Provisional Patent Application Ser. No. 60/423,593, filed on Nov. 5, 2002. The subject matter of this earlier filed application is hereby incorporated by reference.

BACKGROUND OF THE INVENTION

1. Field of the Invention

The present invention relates to devices and methods that allow for data to be transferred while preserving integrity of that data. The present invention further relates to a technique for acquiring and multiplexing together different signal types, wherein that technique is used for instrumentation recorders or for delivering the signals across a communications link. The signals can be multiplexed together and written onto magnetic media, compact disk, or similar archiving mechanisms or sent to another module through the communications link. Thereafter, the signals can be reconstructed, either from the stored signals or after being retrieved after being sent across a network, while maintaining the fidelity and phase relationships of the original signals 2. Description of Related Art There are many processes in data acquisition and processing that require obtaining, processing and transferring data. As an example, if video and audio data are obtained through a camera apparatus and it is desirous that the audio and video data be transferred for viewing at a distant location, the audio and video is often combined and then transferred over a network. When the signals are combined, it is important for the relationships between the signals to be maintained so that the signals can be coherently displayed or evaluated at the destination.

There are a number of prior art methods that utilize multiplexing techniques and formats with tape recorders that are standardized. Many of these prior art techniques involve taking in different signal types, perhaps all in a digital format or analog signals that are going to be digitized through some sort of sampling technique. It is important that enough information be captured so that the signals may be reconstructed with some fidelity. With an analog signal, some of the issues are how rapidly the data are sampled in a phase/frequency context, how many bits are used to represent the changes in amplitude in the dynamic range, etc. However, these techniques do not usually maintain the phase relationships between the signals in addition to the fidelity of the signals and they do not automatically adapt to changes in the data rate of the input channels.

There are ways to adapt to changes in signal data rates and to maintain the phase relationships between the signals, and when the prior art methods do address rate adaptation and the maintenance of phase relationships, these methods result in the multiplexed data having formats that have fairly high overheads. In a multiplexer, there is a certain bandwidth of signals coming in, in terms of the frequency content of the analog signal or the clocking rate of the digital signal and then there's an information rate of the digital stream coming out. The overhead is the difference between the output information rate and the sum of the input information rates. Existing techniques that maintain the phase relationships between the signals result in high overheads in that they output a lot of data either to the tape or to the network regardless of how much data is actually being received As such, there is a need for a method or mechanism that can provide for maintaining the information necessary to reconstruct the signals accurately, such that they maintain the same base relationship to one another. In addition, there is also a need for a system and method that maintains the phase relationships between the signals in a way that provides a lower overhead, meaning that the amount of data sent is only a small percentage greater than what is actually coming in.

SUMMARY OF THE INVENTION

This invention seeks to overcome the drawbacks of the above-described conventional multiplexing devices and methods. The present application provides for a technique for acquiring the signals and maintaining the information necessary to reconstruct them accurately. In addition, the present application also maintains the relationships between the signals in a way that provides a lower overhead, meaning that the amount of data sent out is only a small percentage greater than the amount of data actually coming in.

According to one aspect of this invention, a process of acquiring, transmitting and reconstructing data signals is disclosed. The method includes the steps of monitoring a timing reference signal and a sample interval signal produced by a timing reference, receiving an input data signal on an input/output module, sampling the input data signal using one of an external sample clock and an internal sample clock and measuring an input rate, based on a number of samples received during a sample interval, a duration count, based on a number of cycles of the timing reference signal between a first sample and a last sample received during the sample interval, and a delay count, based on a number of cycles of the timing reference signal received between a start of the sample interval and a first sample clock cycle of the one of the external sample clock and the internal sample clock. The method also includes the steps of creating data packets, based on sampled input data and the measured input rate, and the measured delay count for each sample interval, transmitting the data packets, receiving the data packets and reconstructing the input data signal based on the data packets.

Alternatively, the process may include transmitting the data packets over a network and the step of receiving the data packets comprises receiving the data packets over the network. Additionally, the process may include storing the data packets on a storage medium and the step of receiving the data packets comprises retrieving the data packets from the storage medium. Also, the process may include transferring the data packets to a central processing unit and the step of transmitting the data packets is performed by the central processing unit. In addition, the step of monitoring a timing reference signal produced by a timing reference can also include monitoring an end of interval signal produced by the timing reference.

According to another embodiment of the invention, a process of processing data signals is disclosed. The method includes the steps of monitoring a timing reference signal produced by a timing reference, receiving input data signals on input/output modules, sampling the input data signals using one of an external sample clock and an internal sample clock, measuring an input rate, based on a number of samples received during a sample interval, a duration count, based on a number of cycles of the timing reference signal between a first sample and a last sample received during the sample interval, and a delay count, based on a number of cycles of the timing reference signal received between a start of the sample interval and a first sample clock cycle of the one of the external sample clock and the internal sample clock and creating data packets, based on sampled input data and the measured input rate, and the measured delay count for each sample interval.

According to another embodiment of the invention, a process of reconstructing data signals is disclosed. The method includes the steps of receiving data packets, retrieving an input rate, based on a number of samples acquired during a sample interval in an original data signal, a duration count, based on a number of cycles of a timing reference signal received between a first sample clock and a last sample clock in the sample interval, and a delay count, based on a number of cycles of the timing reference signal received between a start of the interval and a first sample clock cycle of a sample clock in the original data signal, determining a measured data rate and a phase offset for the original data signal, based on sampled input data and the input rate, the duration count and the delay count for each interval and reconstructing the original data signal based on input data contained in the data packets and the determined measured data rate and phase offset.

According to another embodiment of the invention, a system for acquiring, distributing and reconstructing data signals is disclosed. The system includes input/output modules, sending and receiving data signals and sample clock signals, a timing reference, providing a reference clock signal and an end of interval signal to each of the input/output modules, a central processing unit, sending and receiving data packets to and from the input/output modules and a data packet interface in communication with the central processing unit, for sending and receiving data packet to and from at least one of a network and a data storage medium. The input/output modules are configured to create data packets based on sampled input data and an input rate, a duration count and a delay count for each interval of the data signals and are configured to reconstruct an original data signal based on input data contained in the data packets and a measured data rate and a determined phase offset.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
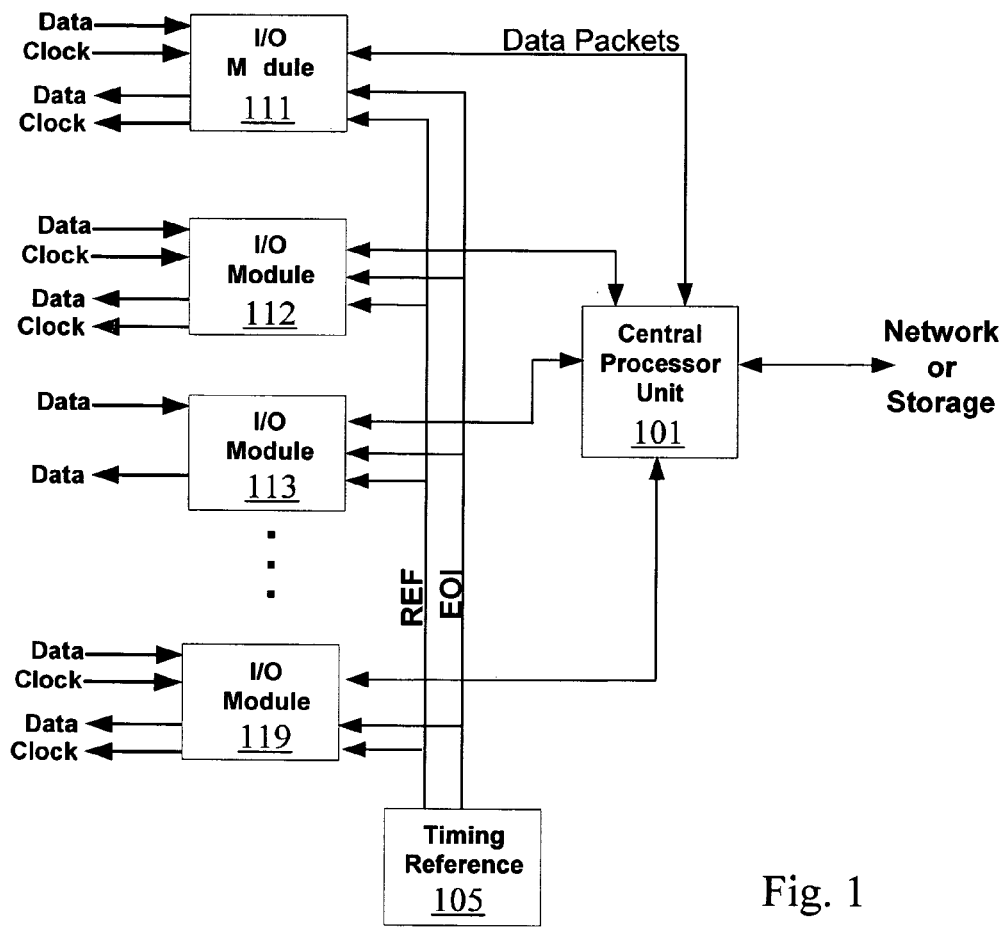
FIG. 1 is a block diagram illustrating the multiplexing and demultiplexing architecture, according to one embodiment of the present invention.

The present invention is directed to a technique for acquiring and multiplexing different signal types, wherein that technique is used for instrumentation recorders or for delivering the signals across a communications link. The signals can be multiplexed and written onto magnetic media, compact disk, or similar archiving mechanisms. Thereafter, the signals can be reconstructed, or similarly are sent across a network.

The present invention is also directed to modules that store the signals that are multiplexed and thus allow the relationships between the signals to be preserved. The present invention provides for a method that not only allows for signals themselves to be transferred from point A to point B, but also maintains the relationships between the signals and thus stay synchronized. While the majority of the discussion in the present disclosure targets IP-based networks, the present invention is not so limited; the present invention is applicable to ATM or other network protocol based networks.

According to one embodiment of the present application, the present invention is applicable to satellite ground networks, where one has telemetry and command serial data signals and analog timing signals that need to be sent between remote ground stations and control centers while maintaining the bit integrity and also maintaining the timing relationship between the signals. It is also important to do it in such a way that significantly more bandwidth on the network is not used than is necessary.

In general, the present invention is not limited to any type of signals to be processed. In the prior art, it is not only the signal types, but also in the rates of the signals that different techniques will handle, i.e. from low data rate to high data rate, serial and analog, that are important. For example, when one plays a digital video, it is understood what frame sampling rate is going to be used and the multiplexing and the audio sampling rate are chosen commensurate with the frame sampling rate. The multiplexing of the video and audio signals is specific to the type of signals. Therefore, the multiplexing scheme in the synchronization is inherent in how those two sampling rates are related and are derived from the same clocking source. In the present invention, as might be applied to video and audio data, the method employed by the present invention would have the same end result of maintaining synchronization. However, applying the digital video and audio multiplexing technique to other types of data would not provide the benefits of the present invention because that technique is data specific.

Another aspect of the present invention is as a general instrumentation recorder, such that it may be used in the recording of seismic or acoustic signals, or any type of signals where there are multiple channels for which the data is acquired. The present invention is also applicable to signal intelligence in radar, sonar, or other sorts of data. It is also specifically applicable to distant stations where one has varying signal types with varying rates and a channel-to-channel time correlation may still be maintained.

According to one embodiment of the present invention, the invention is directed to an advanced multiplexing/demultiplexing and network distribution system for high performance data acquisition applications. The system can reliably deliver serial data, time, voice, and video over IP, ATM or other protocol based networks. Data from each channel is encapsulated into variable length packets and multiplexed into a network socket connection or multicast group. Remote systems receive the data stream from the network and demultiplex it to reproduce the original data and time signals. The multiplexing algorithm utilized through the present invention provides low overhead, low throughput delay, and excellent time correlation between channels. The present invention provides the flexibility to route any input source to any destination on the network and an input source can also be multicast to multiple destinations or to multiple output channels at the same destination.

The multiplexing/demultiplexing (mux/demux) systems of the present invention implement a packet multiplexing scheme on multiple channels of digital and analog data. Variable length packets are formed for each channel in a fixed time interval. All channels are sampled continuously with automatic rate-detecting digital serial I/O channels, or selectable rate A/D conversion for analog channels. The multiplexed packets are then sent to a buffered network interface or recorded to disk. The demultiplexer scheme involves an automated rate adjust reconstruction system for each channel, including both analog and digital streams.

The multiplexing process follows a multiplexing algorithm that maintains channel to channel phase relationships, supports variable data rates with automatic rate adaptation, minimizes overhead and throughput latency and supports any analog or digital signal type. The input signals can be sampled with an externally provided clock that is synchronous with the data or an internally generated clock and provides for little to no loss of data.

The system contains some number of Input/Output (I/O) modules 111–119 with interface electronics for the different signal types. The general architecture is illustrated in FIG. 1. The I/O modules are connected to a Central Processor Unit 101 (CPU) by a system bus, such as a PCI bus. The system also contains network (e.g. Ethernet, etc.) and storage (e.g. SCSI, etc.) interfaces.

A timing reference 105 generates timing signals that are used to synchronize the operation of the I/O Modules. The timing reference generates a high frequency reference clock (REF) and an End of Interval (EOI) signal. The EOI signal marks the end of a sample interval. The REF clock frequency should be at least 4 times the highest input clock rate. The EOI frequency is some integral divisor of the REF clock frequency. The EOI frequency should be at most one half (¼) of the lowest input clock rate.

Figure 2:
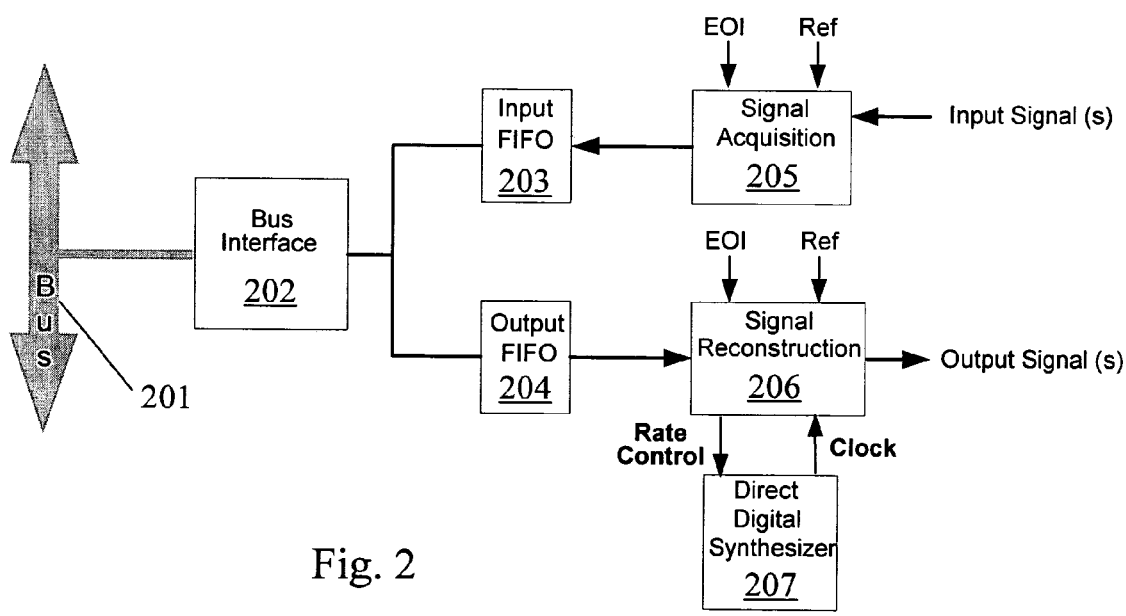
FIG. 2 illustrates a block diagram of the input and output modules, according to one embodiment of the present invention.

The I/O module architecture is illustrated in FIG. 2. The logic may be used to implement the Mux/Demux algorithm, the data buffers 203 and 204, and the bus interface 202 are the same for all I/O modules. The bus interface 202 interfaces with the bus 201, such as a PCI bus. Input signals are received via the signal acquisition module 205 and output signals to the input FIFO 203. Output signals are received via output FIFO 204 and sent to the signal reconstruction module 206 and the reconstructed output signals are sent from the module 206. The signal reconstruction module 206 works with the direct digital synthesizer (DDS) 207 to reconstruct the signals. The interface electronics are specific to each signal type.

Figure 3:
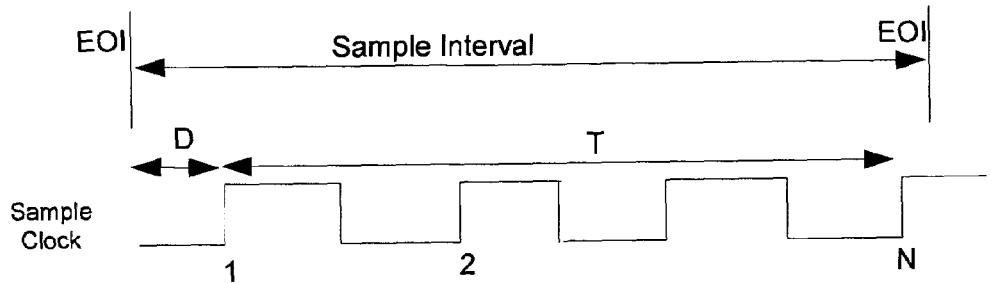
FIG. 3 illustrates a signal acquisition timing diagram, according to an embodiment of the present invention.

With respect to signal acquisition, each I/O module samples the input data using an external or internal sample clock. Every sample interval the I/O module latches the count of samples received (N) and the duration count (T), the number of Reference (REF) clock cycles between the first sample clock and the last sample clock in the interval. Each Input module also latches the delay count (D), the number of timing reference (REF) clock cycles between the start of the interval and the first sample clock. The timing diagram provided in FIG. 3 illustrates the relationship between the sample interval delineated by the EOI signal, the sample clock, the sample count (N), the duration count (T), and the delay count (D).

The I/O module creates a data packet from the data acquired during each interval and the N, T, and D counts from that interval. These variable length data packets provide all of the information that is necessary to accurately reconstruct the signal with the correct data rate and channel-to-channel phase relationships. According to one embodiment of the present invention, the input packet format is shown below:

TABLE 1

| Length Count (N) | Delay Count (D) | Duration Count (T) | Data Field (variable length) |
|---|---|---|---|

The instantaneous data rate during the interval is given by:

$$Fi = REF \text{ Frequency} * (N-1)/T \text{ Hz} \qquad (1)$$

The instantaneous rate measurement is used to reconstruct the signal at the correct rate. The rate measurement will have a small bias due to the quantization of the period T in terms of the Reference clock period. The signal reconstruction logic compensates for this frequency error.

The signal reconstruction logic regenerates the original signal from the data packets. A direct digital synthesizer is used to reconstruct the output clock. The data packet headers are modified to provide the rate information in a format the can be easily used to program the direct digital synthesizer each interval. According to one embodiment of the present invention, the output packet format is shown below:

TABLE 2

| Length Count (N) | Delay Count (D) | DDS Phase Accumulator Offset | Data Field (variable length) |
|---|---|---|---|

The Signal Reconstruction logic uses the N count to determine how much data is contained in the packet. The Signal Reconstruction logic uses the D count to delay the first bit clock in the interval until the correct instant.

The Signal Reconstruction logic programs the DDS with the phase offset value in the header each interval. The DDS phase accumulator offset is calculated to produce the desire output rate (based on the measured input rate). The instantaneous measured data rate during the interval is given by:

$$Fi = REF \text{ Frequency} * (N-1)/T \text{ Hz} \qquad (2)$$

For a DDS with a 32-bit phase accumulator, the DDS phase offset is given by:

$$DDS \text{ phase offset} = Fr/REF \text{ Freq} * 2^{32} \qquad (3)$$

The Signal Reconstruction logic counts the number of sample clocks generated during each sample interval (N'). This may be slightly different than the number of sample clocks captured for the same interval due to the error in the instantaneous data rate measurement. The Signal Reconstruction logic accumulates the number of samples received per interval (N) and the number of samples output per interval (N'). The difference in these values is used as the input to a control loop that computes an error term that is applied to the DDS phase offset. If N is larger than N' then the output clock rate is too low and a positive correction term is added to the DDS phase offset to increase the frequency. If N is less than N' then the output clock rate is too high and a negative correction term is added to the DDS phase offset to decrease the frequency.

Figure 4:
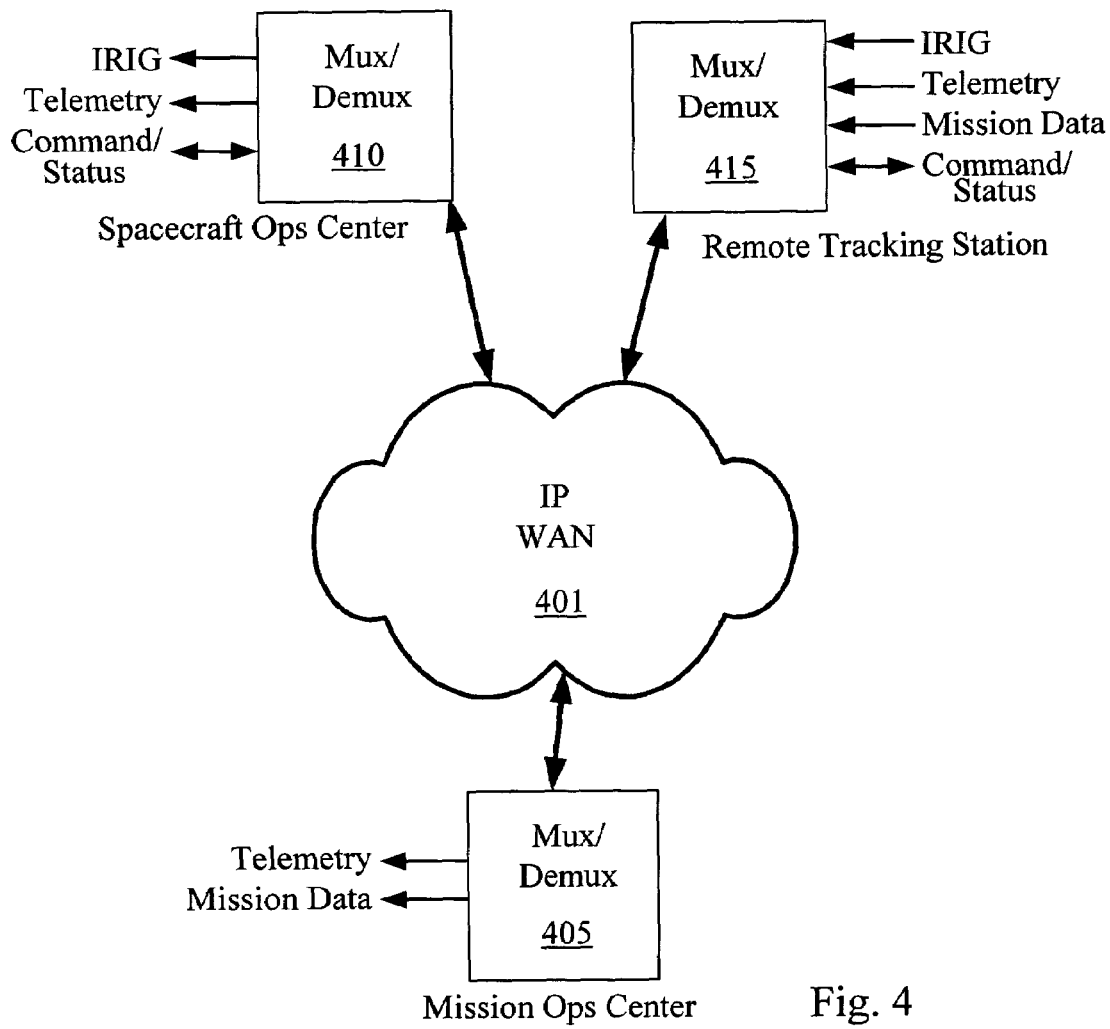
FIG. 4 provides a schematic representation of a satellite control network application, according to one embodiment of the present invention.

Applications of the present invention include use with satellite telemetry and command networks, launch range data distribution, flight test, remote sensing, and video and audio multiplexing. A typical application of the present invention is in the communications segment for a satellite control network, as shown in FIG. 4. The Multiplexer/Demultiplexer distributes telemetry, command, and IRIG time between the remote tracking station and the operations centers using an IP based Wide Area Network (WAN). In the embodiment illustrated in FIG. 4, the Multiplexer/Demultiplexer 405 at the mission operations center receives packets containing telemetry and mission data through a connection to the IP WAN 401. The IP WAN is also connected to the spacecraft operations center having an Multiplexer/Demultiplexer 410 that receives packets containing telemetry and IRIG time signals and outputs those signals.

Additionally, the I/O module 410 receives commands and sends status information. The commands and status information are received by and sent from, respectively, the remote tracking station's I/O module 415. The I/O module 415 receives and sends the data shown in FIG. 4. As discussed above, an important aspect of the satellite control network application is that the multiplexer/demultiplexer automatically adapt to changes in the input data rates and that the phases and timings between the different types of data are preserved. A variety of Input/Output (I/O) modules may be utilized with the present invention to accommodate different signal types and interfaces It would also be within the scope of the invention to implement the disclosed elements of the invention in discrete electronic components, thereby taking advantage of the functional aspects of the invention. Additionally, the present invention can be implemented totally or partially through software.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of acquiring, transmitting and reconstructing data signals, said process comprising:
   monitoring a timing reference signal and a sample interval signal produced by a timing reference;
   receiving an input data signal on an input/output module;
   sampling the input data signal using one of an external sample clock and an internal sample clock;
   measuring an input rate, based on a number of samples received during a sample interval, a duration count, based on a number of cycles of the timing reference signal between a first sample and a last sample received during the sample interval, and a delay count, based on a number of cycles of the timing reference signal received between a start of the sample interval and a first sample clock cycle of the one of the external sample clock and the internal sample clock;
   creating data packets, based on sampled input data and the measured input rate, and the measured delay count for each sample interval;
   transmitting the data packets;
   receiving the data packets; and
   reconstructing the input data signal based on the data packets.

2. A process as recited in claim 1, wherein said step of transmitting the data packets comprises transmitting the data packets over a network and said step of receiving the data packets comprises receiving the data packets over the network.

3. A process as recited in claim 1, wherein said step of transmitting the data packets comprises storing the data packets on a storage medium and said step of receiving the data packets comprises retrieving the data packets from the storage medium.

4. A process as recited in claim 1, further comprising transferring the data packets to a central processing unit and said step of transmitting the data packets is performed by the central processing unit.

5. A process as recited in claim 1, wherein said step of monitoring a timing reference signal produced by a timing reference comprises monitoring the timing reference signal and an end of interval signal produced by the timing reference.

6. A process of processing data signals, said process comprising:
   monitoring a timing reference signal produced by a timing reference;
   receiving input data signals on input/output modules;
   sampling the input data signals using one of an external sample clock and an internal sample clock;
   measuring an input rate, based on a number of samples received during a sample interval, a duration count, based on a number of cycles of the timing reference signal between a first sample and a last sample received during the sample interval, and a delay count, based on a number of cycles of the timing reference signal received between a start of the sample interval and a first sample clock cycle of the one of the external sample clock and the internal sample clock;
   creating data packets, based on sampled input data and the measured input rate, and the measured delay count for each sample interval.

7. A process as recited in claim 6, further comprising transmitting the data packets over a network.

8. A process as recited in claim 6, further comprising storing the data packets on a storage medium.

9. A process as recited in claim 6, further comprising transferring the data packets to a central processing unit and said step of transmitting the data packets is performed by the central processing unit.

10. A process as recited in claim 6, wherein said step of monitoring a timing reference signal produced by a timing reference comprises monitoring the timing reference signal and an end of interval signal produced by the timing reference.

11. A process of reconstructing data signals, said process comprising:
   receiving data packets;
   retrieving an input rate, based on a number of samples acquired during a sample interval in an original data signal, a duration count, based on a number of cycles of a timing reference signal received between a first sample clock and a last sample clock in the sample interval, and a delay count, based on a number of cycles of the timing reference signal received between a start of the interval and a first sample clock cycle of a sample clock in the original data signal;

determining a measured data rate and a phase offset for the original data signal, based on sampled input data and the input rate, the duration count and the delay count for each interval; and reconstructing the original data signal based on input data contained in the data packets and the determined measured data rate and phase offset.

12. A process as recited in claim 11, wherein said step receiving data packets comprises receiving data packets over a network.

13. A process as recited in claim 11, wherein said step receiving data packets comprises retrieving data packets from a storage medium.

14. A process as recited in claim 11, wherein said step of determining a measured data rate and a phase offset for the original data signal comprises providing a direct digital synthesizer with rate control data, receiving a reconstructed clock signal from the direct digital synthesizer and determining the measured data rate and the phase offset for the original data signal based on sampled input data and the input rate, the duration count, the delay count for each interval and the reconstructed clock signal.

15. A system for acquiring, distributing and reconstructing data signals, said system comprising:

input/output modules, sending and receiving data signals and sample clock signals;

a timing reference, providing a reference clock signal and an end of interval signal to each of the input/output modules;

a central processing unit, sending and receiving data packets to and from the input/output modules; and a data packet interface in communication with the central processing unit, for sending and receiving data packet to and from at least one of a network and a data storage medium;

wherein input/output modules are configured to create data packets based on sampled input data and an input rate, a duration count and a delay count for each interval of the data signals and are configured to reconstruct an original data signal based on input data contained in the data packets and a measured data rate and a determined phase offset.

16. A system as recited in claim 15, wherein each input/output module of said input/output modules comprises a signal acquisition unit and a signal reconstruction unit, wherein the signal acquisition unit receives data signals, the reference clock signal and the end of interval signal and outputs data packets, and wherein the signal reconstruction unit receives data packets, the reference clock signal and the end of interval signal and outputs the original data signal.

17. A system as recited in claim 16, wherein each input/output module of said input/output modules further comprises a direct digital synthesizer, wherein the direct digital synthesizer receives a rate control signal from the signal reconstruction unit and provides a reconstructed clock signal to the signal reconstruction unit.

18. A system as recited in claim 15, wherein said step receiving data packets comprises retrieving data packets from a storage medium.

* * * * *